United States Patent [19]

Goupy et al.

[11] 4,029,350
[45] June 14, 1977

[54] ENERGY ABSORBING DEVICE

[75] Inventors: Marcel Goupy; Pierre Roubinet, both of Boulogne-Billancourt, France

[73] Assignees: Regie Nationale des Usines Renault; Automobiles Peugeot, both of Paris, France

[22] Filed: Mar. 4, 1975

[21] Appl. No.: 555,106

[30] Foreign Application Priority Data

Mar. 5, 1974 France .......................... 74.07434

[52] U.S. Cl. ............................................. 293/71 R
[51] Int. Cl.² ........................................ B60R 19/04
[58] Field of Search ................ 293/1, 71 R, 62, 63, 293/71 P, 88, 70, 87, 98, 71; 188/1 C

[56] References Cited

UNITED STATES PATENTS

| 3,493,257 | 2/1970 | Fitzgerald et al. | 293/63 X |
| 3,744,835 | 7/1973 | Carbone et al. | 293/1 |
| 3,866,963 | 2/1975 | Weller | 293/88 |
| 3,869,167 | 3/1975 | Muller | 293/70 X |
| 3,884,516 | 5/1975 | Gallion et al. | 293/71 R |
| 3,888,531 | 6/1975 | Straza et al. | 293/70 X |
| 3,901,543 | 8/1975 | Norlin | 293/88 X |
| 3,917,332 | 11/1975 | Puleo | 293/63 |
| 3,926,463 | 12/1975 | Landwehr et al. | 293/88 X |

FOREIGN PATENTS OR APPLICATIONS 1,923,305 10/1970 Germany .......................... 293/71 R Primary Examiner—Stanley H. Tollberg
Assistant Examiner—Norman L. Stack, Jr.
Attorney, Agent, or Firm—Fleit & Jacobson

[57] ABSTRACT

This invention relates to an energy absorbing device intended to be used as a composite bumper. Said bumper comprises an energy absorbing beam, a deformable unit comprising at least two energy absorbing members located between the beam and the vehicle chassis, said beam being supported by said members, and a flexible shield wrapping either both aforesaid constituting units or a portion thereof.

5 Claims, 15 Drawing Figures

ENERGY ABSORBING DEVICE

The invention relates to an energy absorbing device intended to be used as a composite bumper or fender for automotive vehicles.

Many attempts have been made to provide bumpers for automotive vehicles, which could be able to absorb a major portion of the impact energy during a crash. The Applicants have already described and claimed in French Pat. application No. 73/46906 filed on Dec. 28, 1973, advantageous shaped profiles realized by pressing-extrusion of glass chips and at least a strip impregnated with thermofixing resins.

It is the essential object of this invention to provide a composite bumper consisting of three units:
  an energy absorbing beam;
  a deformable unit comprising at least two energy absorbing elements or members located between the beam and the vehicle chassis, said beam being supported by said elements;
  a flexible shield wrapping either the aforesaid constituting units or a portion thereof, a plurality of possibly functionnal device such as reflectors, head lamps, ventilation blades, parking lights, licence plates and the like, being fitted and/or inserted if desired in said shield.

The shield may be molded in synthetic material on the other constituting unit.

All these characteristic features as well as others will become readily apparent from the detailed description which now follows in connection with some embodiments which are given by way of example and not in any sense by way of limitation, reference being made to the accompanying drawings, in which.

Figure 1:
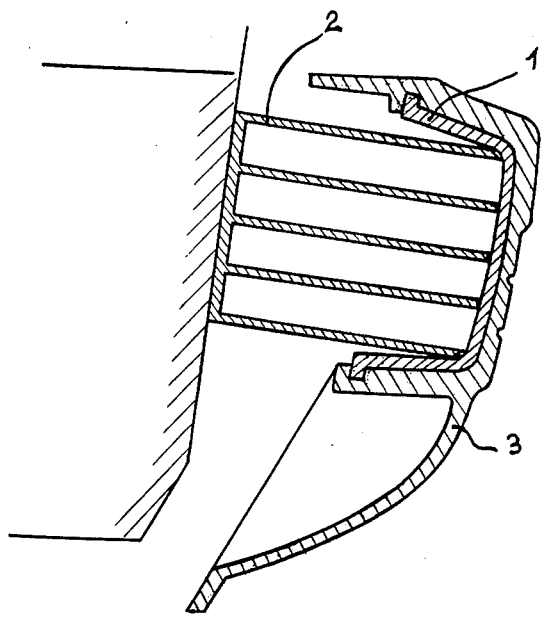
FIG. 1 is a cross-sectional view of an embodiment of a bumper according to the invention.
Figure 2:
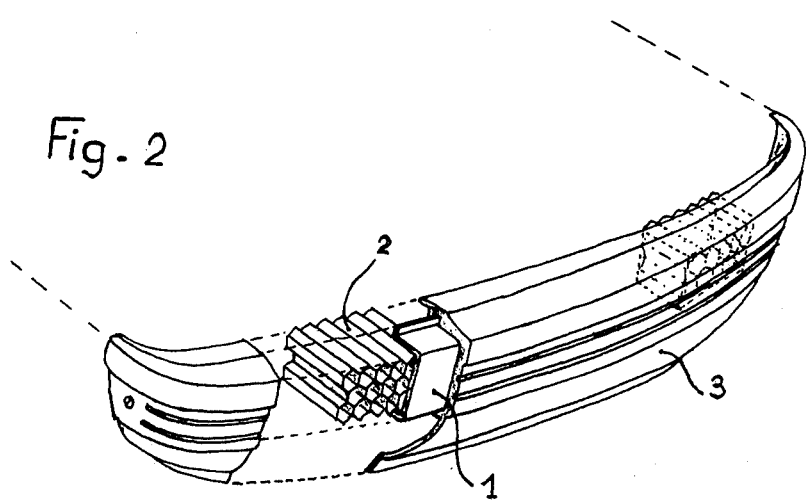
FIG. 2 is an isometric view partially broken away of the bumper according to FIG. 1.

As shown in FIGS. 1 and 2, a U-shaped beam 1 supported by absorbing elements 2 is inserted within a shield 3.

Figure 3:
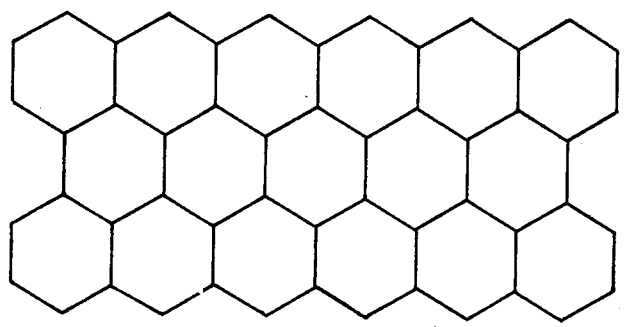
FIGS. 3, 4, 5 show three different forms of embodiments of the cells constituting the energy absorbing elements.
Figure 4:
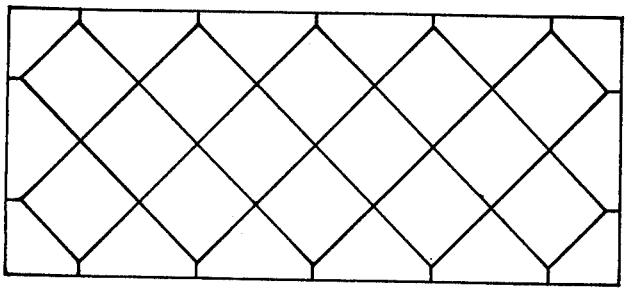
Figure 5:
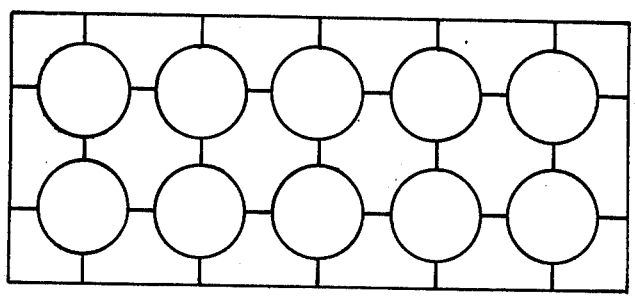

According to a peculiar feature of the invention, the absorbing elements 2 consists of juxtaposed single elongated hollow members having substantially thin walls molded either in thermoplastic resins or in thermosetting resins. In cross section, said members can have different types of contour such as hexagonal (see FIG. 3), squared (see FIG. 4) or circular (as shown in FIG. 5, the relative circles are connected by connecting partitions).

Figure 6:
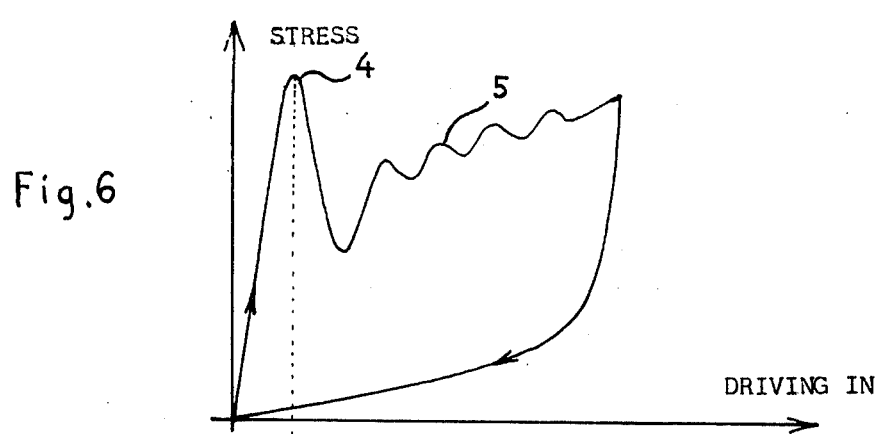
FIGS. 6, 7, 8 are schedules showing the absorbing properties of three different embodiments of bumpers.

When energy absorbing members of these types are subjected to compression stresses, one can see on the curve shown in FIG. 6 a peak 4 corresponding to a maximum stress at which the partitions begin to buckle. Then the curve has an undulated shape 5 corresponding to the formation of successive folds along the hollow elongated members.

According to the present invention, the aforesaid peak, which lowers the absorption yield, defined as a ratio between the effective absorption working to the absorption working corresponding to the product of the maximum stress by the whole driving in, is eliminated. Besides, a stress peak, even temporarily, may be detrimental due to the fact that some local deformations on the chassis to which are fitted the energy absorbing elements may occur.

This stress peak may be obviated by modifying the profile of the support surface area of the energy absorbing elements with respect to either that of the chassis or that of the energy absorbing beam, so that the whole walls could not be subjected to the same impact stress when the driving in is beginning.

Thus, it was required that only either one third or a half of the contact surface area between beam 1, or the chassis, and the energy absorbing elements 2 should be first concerned when a few millimeters are driven in at the impact beginning, while said whole surface area would only be concerned when the driving in gradient corresponding to the stress peak obtained with an energy absorbing device of the known type is attained.

FIGS. 6, 7, 8, 9 show curves of the stress involved by impact as a dependent variable of the driving in.

As previous stated, there were shown on FIG. 6 hollow hexagonal elongated members having parallel partitions. One can see the rising of the impact curve up to peak 4 and then the lowering of said curve, corresponding to the buckling of said partitions, and the further formation of folds 5 corresponding to the wave portion in said curve, as previously stated.

Figure 7:
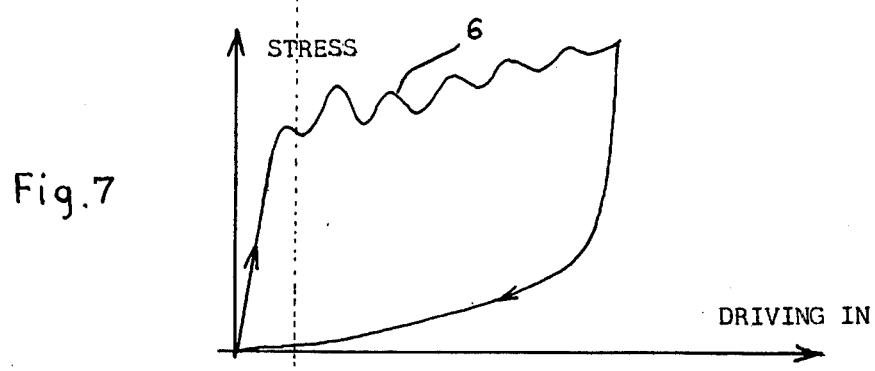
Figure 8:
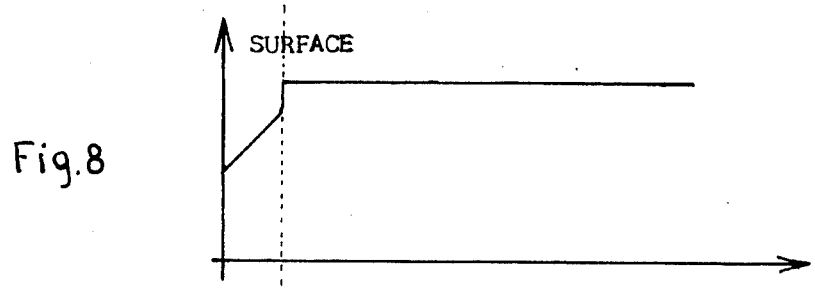

FIG. 7 shows an impact curve for a similar energy absorbing element, except than at least one face of said element has been so shaped as to correspond to the curve shown in FIG. 8. From said curve, it is clear that the whole surface area of said energy absorbing device begins to be concerned only for a driving in corresponding to peak 4 on FIG. 6.

On the contrary, there is not in the curve of FIG. 7 any maximum stress peak but a larger wave portion corresponding to folds 6.

Figure 9:
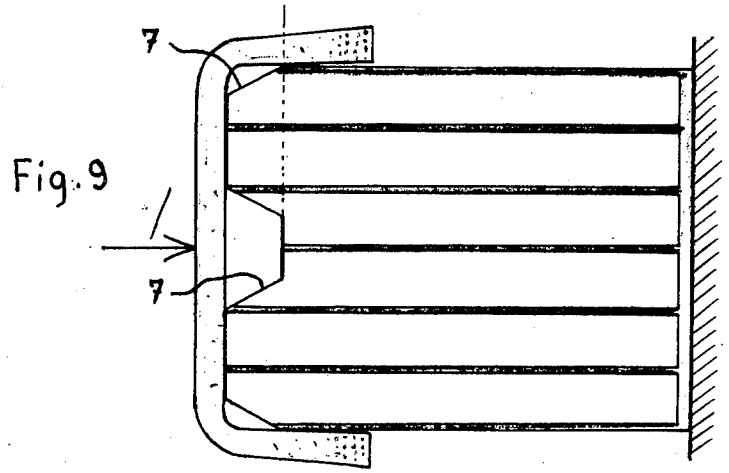
FIG. 9 shows an embodiment of the bumper surface of an energy absorbing device according to the present invention.

In FIG. 9, there is shown, by way of example, an embodiment wherein only a portion of elongated hollow members are in contact with the energy absorbing beam.

Figure 10:
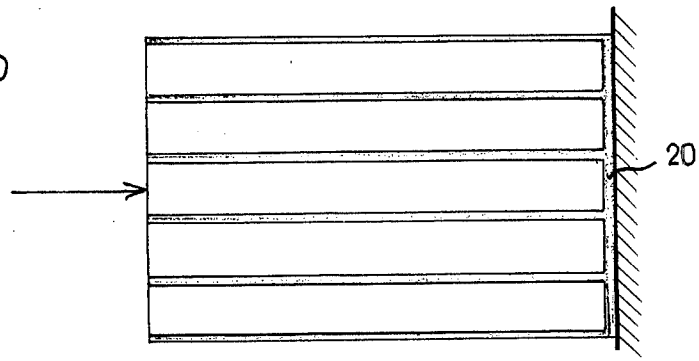
FIGS. 10 to 13 are each a longitudinal cross-sectional view of four different absorbing devices according to the present invention.
Figure 11:
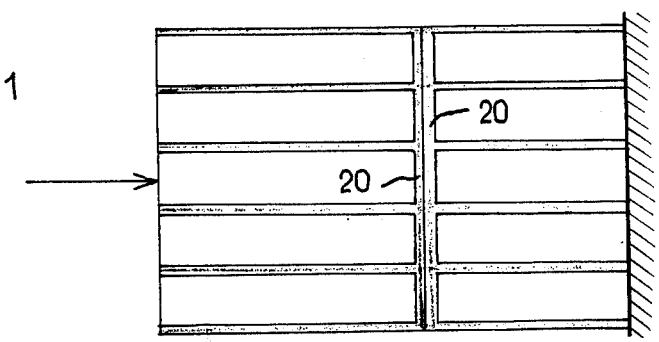

According to another embodiment, provision is possibly made of a connection partition 20 located at a right angle to and integral with the hollow elongated member. Said partition 20 is especially efficient when use is made of hollow members having a great longitudinal size so as to allow important driving in path (as shown in FIG. 10). In fact, it has been found that two energy absorbing elements having a substantially short longitudinal size are more efficient when provided each with such a partition 20 at one end connected together by said ends (as shown in FIG. 11), than one energy absorbing element having the same whole size but provided with only one partition at one end (see FIG. 10).

An energy absorbing element provided with an internal connection partition 20 and having an identical longitudinal size can have the same efficiency as those previously described with regard to the impact stress thus absorbed.

Figure 12:
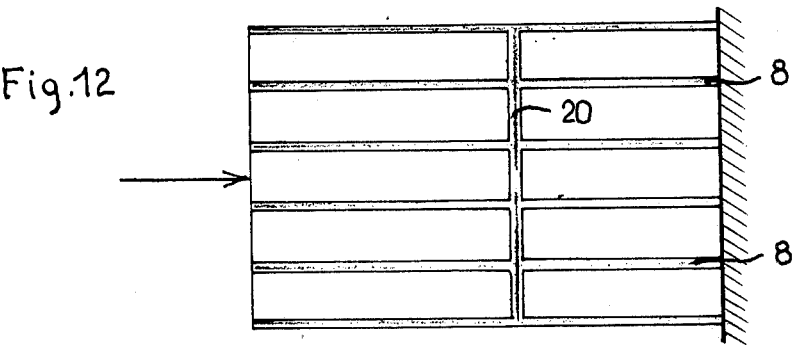
Figure 13:
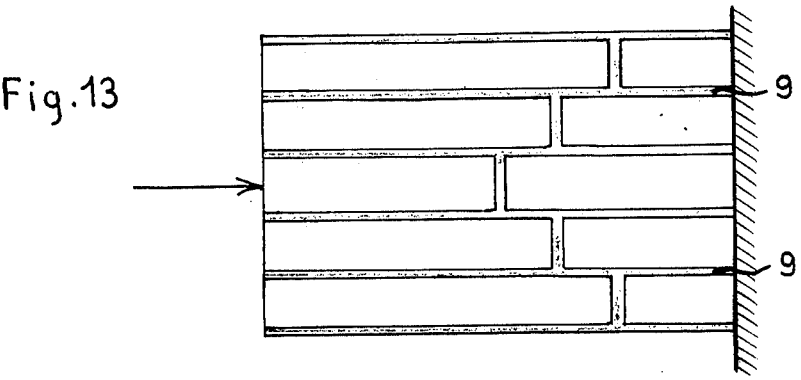

As said energy absorbing elements may be obtained by injection molding, it is possible to obtain said partition at the desired location and with the desired shape (as shown in FIG. 13). As a result of experiments, it should be preferable that the connection partition parts each energy absorbing device at a ratio ranging from 4/10 to 7/10, thus enabling to eliminate some side partition portions as those referenced 8 in FIG. 12, and 9 in FIG. 13.

The energy absorbing elements according to the invention may be made of plastic materials and elastomers selected among a plurality of thermoplastic materials having the required physical properties, such as, for example, polyethylene, polyurethane, thermoplast, thermoplastic elastomers and the like. However, it is advantageous to use a material having a traction elasticity modulus which shows a slight variation with respect to temperature, so as to yield on the element a correspondingly slight variation of the apparent compression modulus.

By way of example, as the initial traction elasticity modulus at room temperature of the selected constituting materials must range from 1000 to 2000 Kgf/cm2, it has been found that thermoplastic polyesters are of peculiar interest due to the slight variation of said modulus between −40° and +60° C.

Thus available products referenced Hytrel 4055 (Trademark on behalf of Dupont de Nemours Cy) having a traction modulus of 500 Kgf/cm2 and Hytrel 5550 (ib. id.) having a traction modulus of 2100 Kgf/cm2 may be mixed in a ratio ranging from 70 : 30 to 30 : 70 as to yield traction modulus ranging from 750 Kgf/cm2 to 1350 Kgf/cm2. For a mixture comprising 40% of Hytrel 4055 and 60% of Hytrel 5550, the apparent compression modulus of an element obtained therefrom at room temperature is increased of 60% at −10°, whereas under the same conditions an element molded in low density polyethylene has a modulus which is substantially triple than the starting one.

Further thermosetting elastomers may be usable when compensing the substantially lower initial modulus thereof by managing walls having a greater thickness. However said elastomers must be selected among those having a slight variation of modulus with respect to the temperature. As a non limiting list, one may cite for example natural elastomers, polyisoprenes, polybutadienes, elastomers of the EPDM type in compounds with oils selected for their slight variation of viscosity with respect to temperature, and silicon elastomers.

As concerns the flexible shield, many processes may be embodied for the molding thereof either starting from a raw material selected among either cross-linkable or vulcanizable elastomers, such as polybutadiene, synthetic or natural elastomers, or starting from injectable thermoplastic materials, such as polyolefins, polyurethan, ethylene compounds, vinyl acetate, polyvinylchloride and the like.

Figure 14:
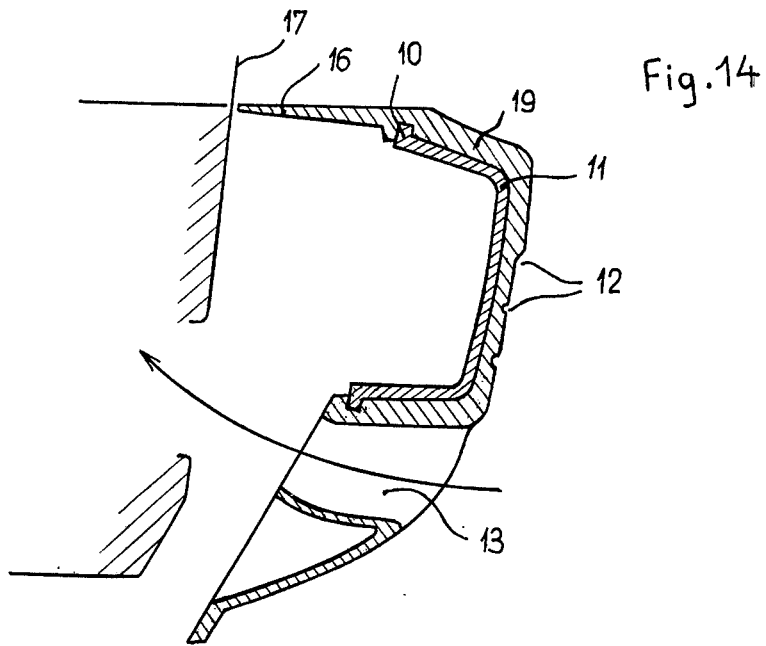
FIGS. 14 and 15 are each a cross-sectional view of a bumper unit together with the shield thereof.
Figure 15:
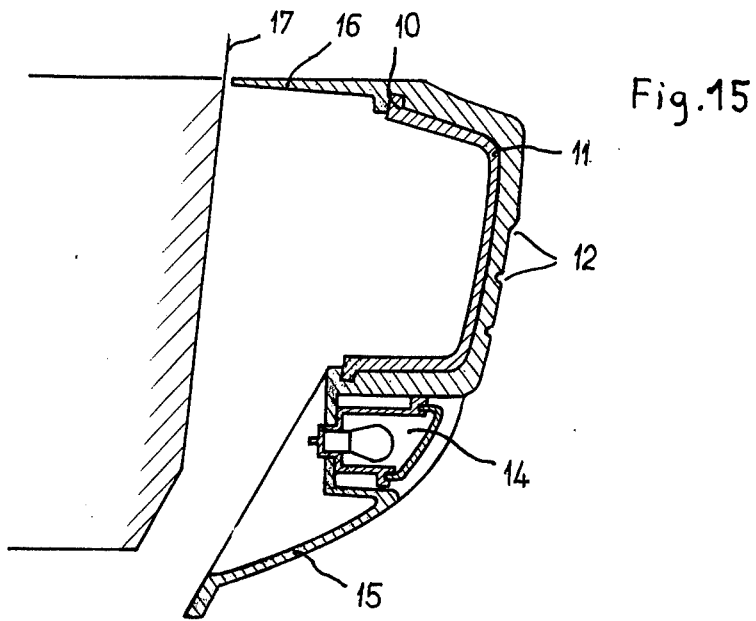

As shown in FIGS. 14 and 15, said flexible shield is so shaped as to have a recess wherein is resiliently inserted the top edges of the U-shaped beam 11. Said shield may be provided on the external face thereof with protusions, recesses and grooves so as to form a desired pattern.

In a preferred embodiment as shown in FIG. 14, the shield may be molded together with a ventilation blading duct 13 for cooling the vehicle motor.

According to another embodiment as shown in FIG. 15, provision is made of a recess 14 intended to receive different lamps and lights, licence plates, reflectors and the like. In both embodiments, the shield is molded together with a lower element 15 and an upper element 17, each abutting on the vehicle chassis and able to be distorted in case of crash when the bumper has been driven in, but without any detrimental effect on the vehicle chassis.

While the aforesaid bumper has been described in terms of specific embodiments, it will be appreciated that other forms may readily be adapted by those skilled in the art without departing from the scope of the present invention.

What we claim is:

1. An energy absorbing device for use as a composite bumper on a vehicle comprising, in combination, a deformable unit including at least two energy absorbing members, each energy absorbing member formed by the juxtaposition of a plurality of elongated hollow members, said elongated hollow members having parallel longitudinal axes, and a partition extending transversely and perpendicular to the longitudinal axes of said elongated hollow members and located in a selected axial position with respect to said longitudinal axes for connecting said members together, wherein said partition is disposed in a selected axial position intermediate the ends of said deformable unit, an energy absorbing beam supported by said energy absorbing members wherein said elongated hollow members are substantially perpendicular to said energy absorbing beam, and a flexible shield disposed in wrapping relationship with at least a portion of said beam and deformable unit.

2. An energy absorbing device in accordance with claim 1 wherein said shield is provided with a recess means for supporting signalling devices.

3. An energy absorbing device in accordance with claim 1 wherein said deformable unit is formed of synthetic resinuous material of the type whose modulus of elasticity, in tension or compression, varies slightly with respect to the temperature.

4. An energy absorbing device in accordance with claim 1 wherein said partition divides said deformable unit into two portions, said two portions having a ratio within the range of between 4:10 to 7:10.

5. An energy absorbing device in accordance with claim 1 wherein the cross-sectional area of said energy absorbing members at one end is between 30% to 50% of the maximum cross-sectional area of said energy absorbing members.

* * * * *